Dec. 23, 1952    J. W. PACKIE    2,622,968
CONTACTING PLATE FOR LIQUID-LIQUID EXTRACTION TOWER
Filed Nov. 13, 1948
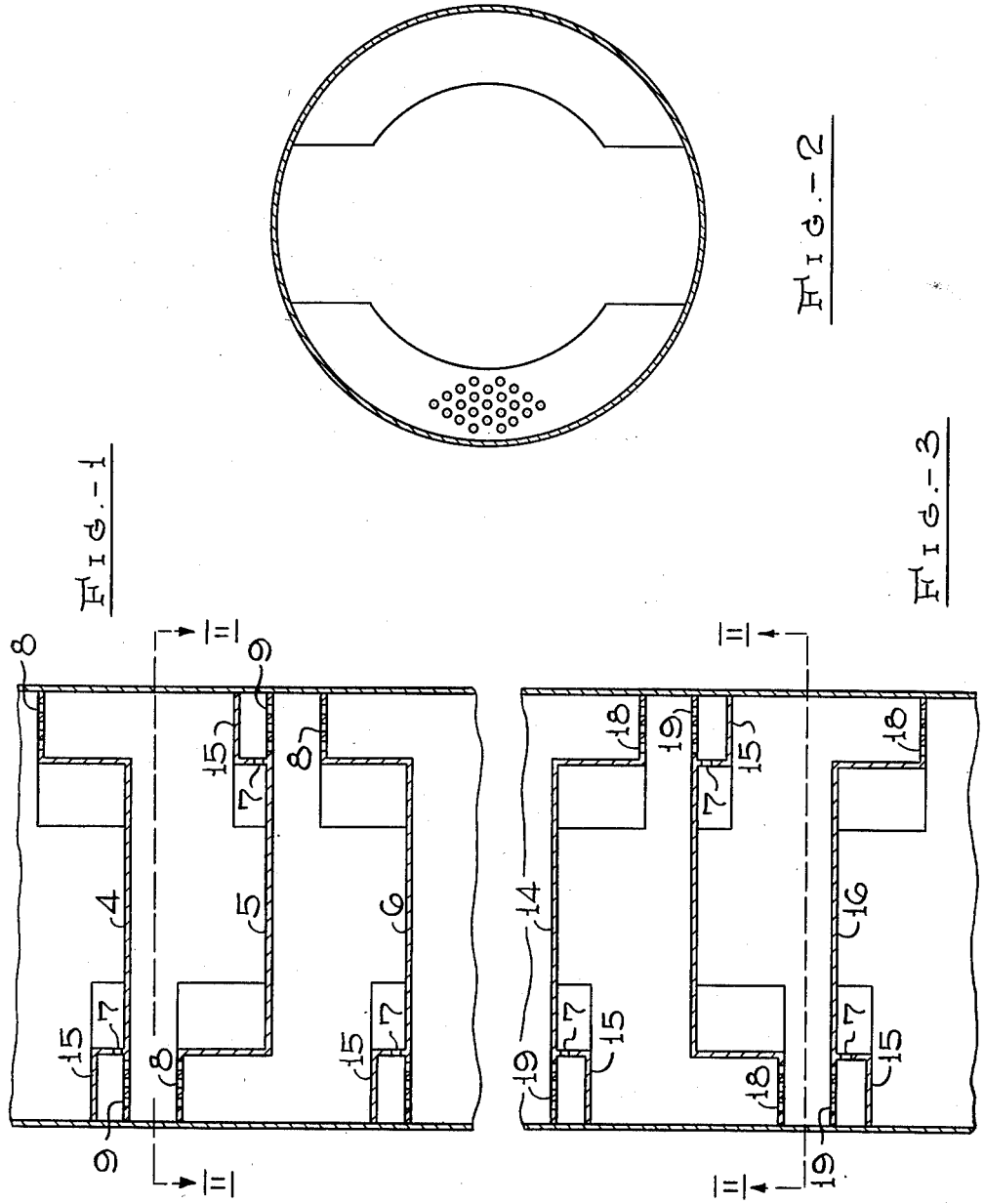
John W. Packie  Inventor
By W. O.␣Heilman  Attorney Patented Dec. 23, 1952

2,622,968

UNITED STATES PATENT OFFICE 2,622,968

CONTACTING PLATE FOR LIQUID-LIQUID EXTRACTION TOWER

John W. Packie, Maplewood, N. J., assignor to Standard Oil Development Company, a corporation of Delaware Application November 13, 1948, Serial No. 59,854

2 Claims. (Cl. 23—270.5)

The present invention relates to an improved process and apparatus for the contacting of two partly miscible liquids or of two substantially immiscible liquids. The invention is adaptable for the contacting of liquids in any liquid-liquid system. The invention is of particular application to liquid-liquid contacting towers employing the principle of mixing and settling the liquids being contacted on each pair of plates throughout the tower. In accordance with the present invention, a restriction is placed in series with the flow of one of the liquid phases through each plate in order to permit optimum selection of pressure drops through the plate.

The invention is directed broadly to processes in which liquids are segregated by selective solvent action. At the present time there are a great many chemical processes in which a selective solvent is used to treat a particular liquid in order to secure a partial segregation of chemical constituents of the liquid. For example, petroleum oils are conventionally treated with solvents such as liquid sulfur dioxide, phenol, creosole, nitrobenzene, furfural, aniline, ether and other solvents or mixture of such solvents. Use of these solvents with petroleum oils is particularly employed to remove low viscosity index constituents of the oil to obtain a treated oil having an improved viscosity index. More generally, such solvent treating processes are employed to selectively remove undesired constituents from the liquid being treated with the solvent or in some cases to recover desired constituents.

In solvent treating operations of the general character above described, many modifications are used to control the solvent extraction process as desired. For example, auxiliary solvents, or modifying agents may be injected into the treating system. Again a wide range of temperature and pressure conditions may be employed in particular types of solvent extractions. The present invention is not concerned with the modifications or refinements of solvent treating processes. However, the invention is concerned with the basic method and apparatus used for contacting liquids whatever the particular system may be. It is, therefore, to be understood that this invention is of application to any liquid-liquid contacting system with any of the modifications, which may be employed in such processes.

Of the many methods which have been devised for the contacting of liquids, it has been found more advantageous to effect large volume interfluid treating in contacting towers rather than in mixers and settlers, centrifuges, etc. Processing in towers is more advantageous from the economic viewpoint because of the lower initial and operating costs. Consequently, considerable attention has been given to the apparatus required for efficient liquid-liquid contacting in towers. The towers which have been employed have been of a wide variety of types, some employing various types of packing materials, others employing bubble cap plates, and others employing a variety of internal baffles. However, of the various types of fluid contacting towers developed, those involving the use of pierced plates have proven to be particularly advantageous in the processing of large quantities of liquids.

Conventional pierced plate towers consist of a large number of horizontally disposed perforated plates extending throughout the tower. The plate perforations provide orifices through which at least one of the liquids may be dispersed. Heretofore, the pierced plates known to the art have been characterized by plate efficiencies not substantially greater than about 50% and in some liquid-liquid systems, as low as about 10%. The term plate efficiency indicates the percentage ratio of the treating effect obtainable by one plate to that obtainable in a perfect mixing and settling stage. Thus one theoretical stage is established by contacting two liquids intimately in a batch mixer followed by a thorough settling in a batch settler. As stated, therefore, conventional pierced plate liquid contacting towers, due to their plate efficiency of less than 50% substantially require a number of plates greater than twice the number of theoretical stages of contacting required. It is clearly of the greatest importance to improve the plate efficiency of the types of pierced plates used in such towers in order to decrease the expense of the contacting and to decrease the size of the towers necessary. In this connection it is also highly advantageous to reduce the size of the tower since the smaller the tower the more responsive the tower is to changes in operating conditions. It is, therefore, the principal object of this invention to provide an improved type of pierced plate extraction tower in which the plate efficiencies are substantially greater than those presently obtainable.

In analyzing the necessary mechanism required in liquid-liquid contacting it is apparent that two basic effects are required. These are efficient mixing of the liquids followed by efficient separation of the mixed liquids. Thus in extraction towers having a given number of plates, for best overall results it is necessary that each set of plates provide good mixing and provide good settling. Only by achieving both of these desiderata in such a tower is it possible to secure treating effects equivalent to a large number of theoretical stages. Thus in considering any one pair of extraction plates, high plate efficiencies can only be obtained if the plates are capable of both thoroughly mixing and thoroughly separating the mixed liquids. It is, therefore, a further and more particular object of this invention to provide a type of pierced plate which will most effectively be capable of thoroughly mixing and thoroughly settling liquid phases passing through each pair of plates.

In order to secure efficient mixing and settling of the liquids it is necessary to consider the basic characteristics of the liquids insofar as their mixing and settling properties are concerned. Thus particular liquids such as phenol and oil may be very readily mixed and when mixed may be difficult to separate. Alternatively, other types of liquids such as aqueous caustic and oil for example may be difficult to mix but may be readily separated. As a result of this factor it is generally necessary to critically adjust a particular extraction tower to secure the optimum treatment of liquids having particular mixing and settling characteristics. It is, therefore, a further object of this invention to provide means for adapting a particular contacting tower employing pierced plates to the optimum contacting conditions for liquids of particular mixing and settling characteristics. This invention is of particular utility in an extraction tower utilized for treating liquids which are easy to mix but difficult to settle, as the invention provides means for critically adjusting the pressure drop across mixing zones of the tower without increasing the mixing effect beyond that desired.

As stated, the present invention is of particular application to the types of pierced plates which provide both a mixing zone and a settling zone between each pair of plates in the extraction tower. In typical embodiments of such plates perforations are employed on each plate through which one of the liquids may be ejected to encounter a continuous stream of the other liquid or to encounter a counter current jet of the other liquid ejected through perforations of an adjacent plate to provide an intimate mixing of the liquids. The mixed liquids are then conducted to an enlarged zone providing relatively low flow rates where the mixed liquids may be separated prior to passage to subsequent plates. In plates of this general type a basic difficulty arises from the possibility of re-mixing or entraining the two fluids after they have been separated. A further difficulty arises from the possibility of liquids flowing through the perforations provided in the opposite direction to that desired, effectively causing at least a portion of the liquid to by-pass one or more plates. It is a further object of the present invention to substantially overcome these difficulties.

In accordance with the objectives of the present invention means are provided adjacent the perforations of an extraction plate to impose a desired pressure drop on at least one of the liquid streams before the liquid reaches the perforations. In other words, means are provided to place an added pressure drop in the stream of liquid just prior to passing through the perforations of an extraction plate. The preferred means for supplying this pressure drop is to place an auxiliary orifice in series with the normal perforations employed. By this means it is possible to critically adjust the total pressure drop through the plate, thereby adjusting the phase level of the liquids on the plate as desired while independently regulating the pressure drop through the perforations of the plate to provide a desired degree of mixing. The nature and objects of this invention will become clear on referring to the following description which relates to the accompanying drawings. In the appended drawings:

Fig. 1 illustrates one embodiment of the invention applied to a simple step-wise perforated plate;

Fig. 2 is a cross-section of Fig. 1 and Fig. 3 through line 2—2 of the figures as shown;

Fig. 3 illustrates a further embodiment of the present invention as it may be applied to what may be said to be an inverted step-wise type of perforated plate.

Referring now to Fig. 1 a portion of an extraction tower is illustrated, employing the step-wise plates identified by the numerals 4, 5 and 6. As illustrated, these plates may be positioned in a substantially vertical round tower extending throughout the vertical height of the tower to provide the desired number of plates, or extraction stages. Each of the plates 4, 5 and 6, consists of two steps, a lower step extending about 0.8 of the distance across the tower and an upper raised step extending for the remaining distance of the tower. The horizontal portion of the upper raised step of each plate is provided with perforations indicated by the numerals 8. Each of the plates are placed in reversed relationship with the next successive plate so that the upper steps of successive plates are on opposite sides of the tower. The portion of the lower step of each plate immediately above the perforations 8 of the upper step of a successive plate is also perforated so as to provide the perforations 9. As illustrated in Fig. 2 the steps and perforations are preferably arranged to encompass a circumferential area of the plate, although if desired the steps and perforations may be placed on a segment of the plate. In the operation of a tower embodying the plates as heretofore described, a heavier liquid will flow downwardly through the tower, while a lighter liquid will flow upwardly through the tower. The heavier liquid passing downwardly will accumulate above the perforations 9 to form a layer of heavy phase on the lower step of each of the plates. Similarly the lighter liquid passing upwardly will form a light phase below the perforations 8 extending somewhat below the underside of the lower step of each of the plates. Between the indicated layers of light and heavy phase liquids, will be an emulsion layer consisting of a mixture of the two liquid phases. As the liquids pass through the tower, the heavy liquid will be jetted downwardly through the perforations 9 counter-current to the flow of the lighter phase liquid upwardly through the perforations 8. As a consequence there will be intimate counter-current mixing of the two liquid phases in the relatively confined space between the perforations 8 and 9. The mixed liquids will then flow into the central portion of the tower provided between the unperforated sections of adjacent plates. In this enlarged section of the tower the flow of the liquids will be at a comparatively low rate so that separation of the phases may occur, the heavier phase tending to settle to form a layer above the perforations 9 and the lighter phase tending to float to form a layer below the perforations 8. The separated phases will then jet through to the next successive plate through the perforations as indicated.

In operating a liquid-liquid contacting tower such as that described, it is desirable to set the number and size of the perforations 8 and 9 so as to secure a desired mixing action. Thus, if the liquids to be mixed are of the type which may readily be mixed the perforations may be numerous so that a comparatively small pressure drop is required to force the liquids through the perforations. Alternatively, if the particular liquid system is hard to mix, the perforations may be smaller in number so that considerable pressure differential is required to force liquids through the perforations so as to enhance the jetting and mixing action of the liquids. While it is clearly desired to secure sufficient mixing to best treat the particular liquids concerned, it is important to avoid unnecessarily exceeding the degree of mixing required as the subsequent separation of the mixed liquids would become more difficult. Thus for example, let it be assumed that the liquids employed are phenol and oil which may be readily mixed but when mixed are difficult to separate. In this liquid-liquid system, the phenol constitutes the heavy phase liquid while the oil constitutes the light phase liquid. The phenol will consequently form a layer on the upper side of the lowermost steps of each of the extraction plates, while the oil will form a layer on the underside of the extraction plates. As indicated, since phenol and oil may be readily mixed it is desirable to maintain the perforations 8 and 9 of a rather coarse size so as not to mix the two liquids too thoroughly. As indicated, if the liquids are mixed more than necessary, the subsequent separating of the mixed liquids would be unduly difficult. For this reason the perforations 9, for example, are chosen to be of such a size and of such a number that the phenol passing through these perforations undergoes a very small pressure drop. Consequently, an extremely thin layer of phenol will be formed on the upper side of the plates above the perforations 9. As indicated, immediately above this thin layer of phenol will exist an emulsion layer of mixed phenol and oil. Consequently, due to the thin layer of phenol formed above the perforations 9, it is possible for the emulsion to pass through the perforations 9. Restating this effect, the consequence of employing perforations to provide a lower pressure drop or a small degree of mixing will be to cause the emulsion layer to lie closely adjacent the perforations of low pressure drop, permitting intermittent or continuous bypassing of the emulsion layer through these perforations. This effect may also be referred to as the undesired entrainment of oil with phenol through the tower. If this entrainment is initiated as indicated, in general the effect becomes progressively worse throughout the tower due to the poor separating characteristics of phenol and oil. As herein developed, therefore, in operating an extraction tower of the type illustrated in Fig. 1, is extremely desirable not to permit the emulsion layer to closely approach any of the plates. On the contrary, it is desired to maintain the emulsion layer at approximately an equi-distance from the plates between which the layer is maintained. By this means sufficient layers of phenol and oil are provided below and above the emulsion layer to prevent the type of entrainment referred to.

In accordance with this invention, auxiliary means are employed to control the pressure drop through the perforations of the plates. As illustrated in Fig. 1, a box-like element 15 is placed over the perforations 9. The box-like element 15 is closed except for slots or perforations 7 provided as shown just above the unperforated section of the plates. Consequently heavy phase liquid may flow along the upper side of each plate through the perforations, or restrictions 7 of the box-like members 15 to reach the perforations 9. The slot provided by the element 15 is so chosen as to provide a desired pressure drop for the heavy phase passing through the restriction. This pressure drop may be so set as to maintain the phase interface midway between the two plates.

In utilizing the invention, therefore, the plates of an extraction tower are first designed so as to have perforations providing sufficient pressure drop to secure a desired degree of mixing. If the liquid-liquid system is phenol and oil, the perforations 8 and 9 will be chosen to impose a comparatively small pressure drop on oil and phenol passing through the perforations so as just to provide the desired degree of mixing. The box-like element 15 will then be so positioned so that the slots or perforations 7 provided between the element 15 and the unperforated section of the plates is such as to provide an aditional pressure drop on the phenol. Consequently, the pressure drop provided by the box-like element 15 and the perforations 8 and 9 may be so chosen as to maintain the emulsion layer of the phenol and oil approximately equi-distant from adjacent plates so that the layer of phenol above the plates of the tower will be sufficiently deep to prevent entrainment of the type referred to. By this means, the efficiency of the extraction plates of the tower may be markedly increased above that obtainable without the utilization of the apparatus of this invention.

Referring now to Fig. 3, a further embodiment of this invention is illustrated as applied to an extraction tower utilizing a different type of perforated plate. In the extraction tower of Fig. 3, the plates employed may be said to be an inverted stepwise arrangement of the plates illustrated in Fig. 1. While not a part of this invention, it may be noted that the apparatus of Fig. 1 is particularly adapted to an extraction tower in which the light phase liquid is maintained as the continuous phase throughout the tower, while the apparatus illustrated in Fig. 3 is particularly adapted for use in an extraction tower wherein the heavy phase is maintained substantially continuous throughout the tower. As shown in Fig. 3, the perforated plates employed, identified by the numerals 14, 15, and 16, comprise two-step plates in which the lower step of the plate is perforated by perforations 18, and in which a portion of the upper step of the plate is perforated by perforations 19. As formerly described in connection with Fig. 1, heavy phase liquid will pass downwardly through the perforations 18 of the lower steps while light phase liquid will pass upwardly through the perforations 19 of the upper steps. If it be assumed that the liquids are of such a nature that mixing is not a serious problem, the perforations 18 and 19 will be chosen to provide a low pressure drop on the liquid passing through these perforations. Consequently, the layer of oil retained below the perforations 19 would normally be a thin layer permitting opportunity for the adjacent emulsion layer to pass upwardly through the perforations 19. Therefore, in accordance with this invention, the box-like element 15 is positioned adjacent to perforations 19 to impose an additional pressure drop on the oil passing through the perforations so as to force the emulsion layer downwardly away from the perforations 19. The advantages obtainable in operating the extraction tower of Fig. 3 are therefore the same as those formerly indicated in connection with Fig. 1.

As described, therefore, the novel extraction plate of this invention provides a means for adjusting the total plate pressure drop independently of the pressure drop through the mixing perforations of an extraction plate so as to maintain the interface levels of the liquids concerned at a desired position between adjacent plates. In other words, by employing the apparatus of this invention, it is possible to adjust the pressure drop of liquids through the perforations of an extraction plate independently of the pressure drop required to maintain proper plate liquid levels. It is apparent that the inventive concept of placing a restriction in series with a liquid stream through the perforations of an extraction plate may be applied to the flow of either the heavy phase, or light phase through the plate. It is furthermore apparent that this basic concept may be varied in many ways. It is, therefore, to be understood that the appended claims rather than the preceding illustrative examples are to be considered definitive of this invention.

What is claimed is:

1. A step type plate member transversely positioned in a vessel, said plate member being provided with a series of passageways through a limited peripheral area thereof adjacent the vessel wall, an angular member secured to said wall in spaced relation to said plate extending from said wall to a point beyond said passageways and having a skirt portion extending to closely spaced relation to said plate beyond the margin of the passageways, said member with the vessel walls forming an enclosed chamber leaving a restricted inlet orifice adjacent the plate.

2. A liquid-liquid contacting tower containing a plurality of spaced transversely disposed perforated plate members, restrictive baffle members disposed in vertically spaced relation to said plate members over at least a portion of the said perforated passageways therethrough, said baffle members having a vertical skirt portion dependent from the inner peripheral edge extending into closely spaced relation to said plate leaving a restricted orifice inlet to the said passageways in the perforated plate members.

JOHN W. PACKIE.

REFERENCES CITED

The following references are of record in the file of this patent:

UNITED STATES PATENTS

| Number | Name | Date |
| --- | --- | --- |
| 1,744,134 | Morrell | Jan. 21, 1930 |
| 1,777,869 | Alexander | Oct. 7, 1930 |
| 1,782,735 | MacKenzie | Nov. 25, 1930 |
| 2,146,651 | Priggs | Feb. 7, 1939 |
| 2,271,462 | Pfennig | Jan. 27, 1942 |
| 2,274,030 | Atkins | Feb. 24, 1942 |
| 2,400,962 | Thompson | May 28, 1946 |
| 2,460,019 | Long et al. | Jan. 25, 1949 |